(12) United States Patent
Bergman et al.

(10) Patent No.: US 9,875,576 B2
(45) Date of Patent: Jan. 23, 2018

(54) THREE-DIMENSIONAL VISUALIZATION MODEL OF ROADWAY INFORMATION IN A PAVEMENT CONDITION ANALYSIS

(71) Applicant: ITERIS, INC., Santa Ana, CA (US)

(72) Inventors: Robert H. Bergman, Grand Forks, ND (US); Eric Dean Kjeldergaard, Grand Forks, ND (US)

(73) Assignee: CLEARAG, INC., Santa Ana, CA (US)

( * ) Notice: Subject to any disclaimer, the term of this patent is extended or adjusted under 35 U.S.C. 154(b) by 281 days.

(21) Appl. No.: 14/989,190

(22) Filed: Jan. 6, 2016

(65) Prior Publication Data

US 2016/0196688 A1 Jul. 7, 2016

Related U.S. Application Data

(60) Provisional application No. 62/100,184, filed on Jan. 6, 2015.

(51) Int. Cl.
| | |
|---|---|
| *G06T 17/00* | (2006.01) |
| *G01C 21/28* | (2006.01) |
| *G06T 11/20* | (2006.01) |
| *B60W 40/06* | (2012.01) |
| *G06T 17/05* | (2011.01) |

(52) U.S. Cl.
CPC ............ *G06T 17/05* (2013.01); *B60W 40/06* (2013.01); *G01C 21/28* (2013.01); *G06T 11/206* (2013.01)

(58) Field of Classification Search
None
See application file for complete search history.

(56) References Cited

U.S. PATENT DOCUMENTS

| | | | | |
|---|---|---|---|---|
| 9,139,204 | B1* | 9/2015 | Zhao | G01C 21/00 |
| 2004/0043760 | A1* | 3/2004 | Rosenfeld | H04L 67/16 |
| | | | | 455/414.3 |
| 2011/0029243 | A1* | 2/2011 | Gallagher | G01K 7/42 |
| | | | | 702/3 |
| 2011/0112760 | A1* | 5/2011 | Serbanescu | G01C 21/32 |
| | | | | 701/465 |
| 2011/0166783 | A1* | 7/2011 | Ren | G01C 21/3638 |
| | | | | 701/455 |
| 2012/0323992 | A1* | 12/2012 | Brobst | G08G 1/168 |
| | | | | 709/203 |
| 2013/0321395 | A1* | 12/2013 | Chen | G01C 21/26 |
| | | | | 345/419 |

(Continued)

*Primary Examiner* — James A Thompson
(74) *Attorney, Agent, or Firm* — Lazaris IP

(57) ABSTRACT

A visualization of pavement conditions that are evaluated with respect to weather, pavement, and sub-surface variables provides users responsible for roadway infrastructure maintenance and monitoring with information such as depths of accumulated precipitation across "slices" of a roadway for each particular time in a given time period. The accumulated precipitation information contains the depths for each of several different types of precipitation and is shown in three dimensions, where x represents the lane of the roadway, y represents the depths of precipitation, and z represents time. A visualization model generates an appearance of a roadway lane upon which the accumulated precipitation increases or decreases over time corresponding to the results of weather and maintenance acting on that lane.

23 Claims, 6 Drawing Sheets

(56) References Cited

U.S. PATENT DOCUMENTS

| | | | |
|---|---|---|---|
| 2013/0332057 A1* | 12/2013 | Moore | G08G 1/0962 701/118 |
| 2013/0345962 A1* | 12/2013 | van Os | G01C 21/3632 701/412 |
| 2015/0331238 A1* | 11/2015 | Roth | B60K 37/00 348/115 |

* cited by examiner

THREE-DIMENSIONAL VISUALIZATION MODEL OF ROADWAY INFORMATION IN A PAVEMENT CONDITION ANALYSIS

CROSS-REFERENCE TO RELATED PATENT APPLICATION(S)

This patent application claims priority to U.S. provisional application 62/100,184, filed on Jan. 6, 2015, the contents of which are incorporated in their entirety herein. In accordance with 37 C.F.R. § 1.76, a claim of priority is included in an Application Data Sheet filed concurrently herewith.

FIELD OF THE INVENTION

The present invention relates to visualizing the condition of a roadway's pavement that has been affected by different maintenance actions, weather events, and traffic through time. Specifically, the present invention relates to illustrating weather conditions and the resultant impact on a roadway over time in a three-dimensional representation that renders information that is otherwise difficult to visualize in an easy to understand manner.

BACKGROUND OF THE INVENTION

Existing methodologies for illustrating the output of pavement condition modeling, and the effects of weather events for improved decision-making regarding maintenance activities on roadways, are very limited. There are multiple models in existence that process many different sets of data to evaluate roadway characteristics such as pavement conditions, and likewise there are many types of systems for evaluating and predicting weather events and the need for maintenance actions on roadways. However, there is no known system or method that enables users to visualize conditions affecting a roadway's pavement in three dimensions over time, together with the impact of weather and traffic conditions and roadway maintenance activities, to evaluate characteristics such as the depth of accumulated precipitation resulting from weather, pavement, and sub-surface variables.

BRIEF SUMMARY OF THE INVENTION

It is therefore one objective of the present invention to provide a system and method of enabling a visualization of the impact of weather conditions on a roadway pavement over time. It is another objective of the present invention to improve maintenance decision making by presenting results of pavement condition modeling in a format that users can use to evaluate the effects of weather and prior maintenance activities on a roadway.

The present invention is a system and method of visualizing past, present, and future data representative of a pavement condition. The present invention visualizes, in one aspect of the present invention, output data from pavement condition modeling and other sources that takes into account traffic, weather, pavement, and sub-surface variables. This output data contains information related to the depths of accumulated precipitation across "slices" of a roadway for each particular time in a given time period. The accumulated precipitation information contains the depths for each of several different types of precipitation. The roadway's pavement is divided into representative samples, or "slices", across a lane of a roadway.

The present invention represents this pavement condition information in three dimensions: x, y, and z. The x-axis represents the lane of the roadway, and the y-axis represents the depths of precipitation. Different colors may be applied to represent the different precipitation types. Using these two dimensions (x and y), the present invention displays a visual representation of what the accumulated precipitation would look like on an actual roadway pavement.

The third dimension, z, is used to represent time. The present invention displays a representation of a lane for each time sample provided by the pavement condition modeling. The result is the appearance of a roadway lane upon which the accumulated precipitation increases or decreases over time corresponding to the results of weather and maintenance acting on that lane.

Other objects, embodiments, features and advantages of the present invention will become apparent from the following description of the embodiments, taken together with the accompanying drawing, which illustrate, by way of example, the principles of the invention.

BRIEF DESCRIPTION OF THE SEVERAL VIEWS OF THE DRAWING

The accompanying drawing, which is incorporated in and constitutes a part of this specification, illustrates several embodiments of the invention and together with the description, serves to explain the principles of the invention.

DETAILED DESCRIPTION OF THE INVENTION

In the following description of the present invention reference is made to the exemplary embodiments illustrating the principles of the present invention and how it is practiced. Other embodiments will be utilized to practice the present invention and structural and functional changes will be made thereto without departing from the scope of the present invention.

Figure 1:
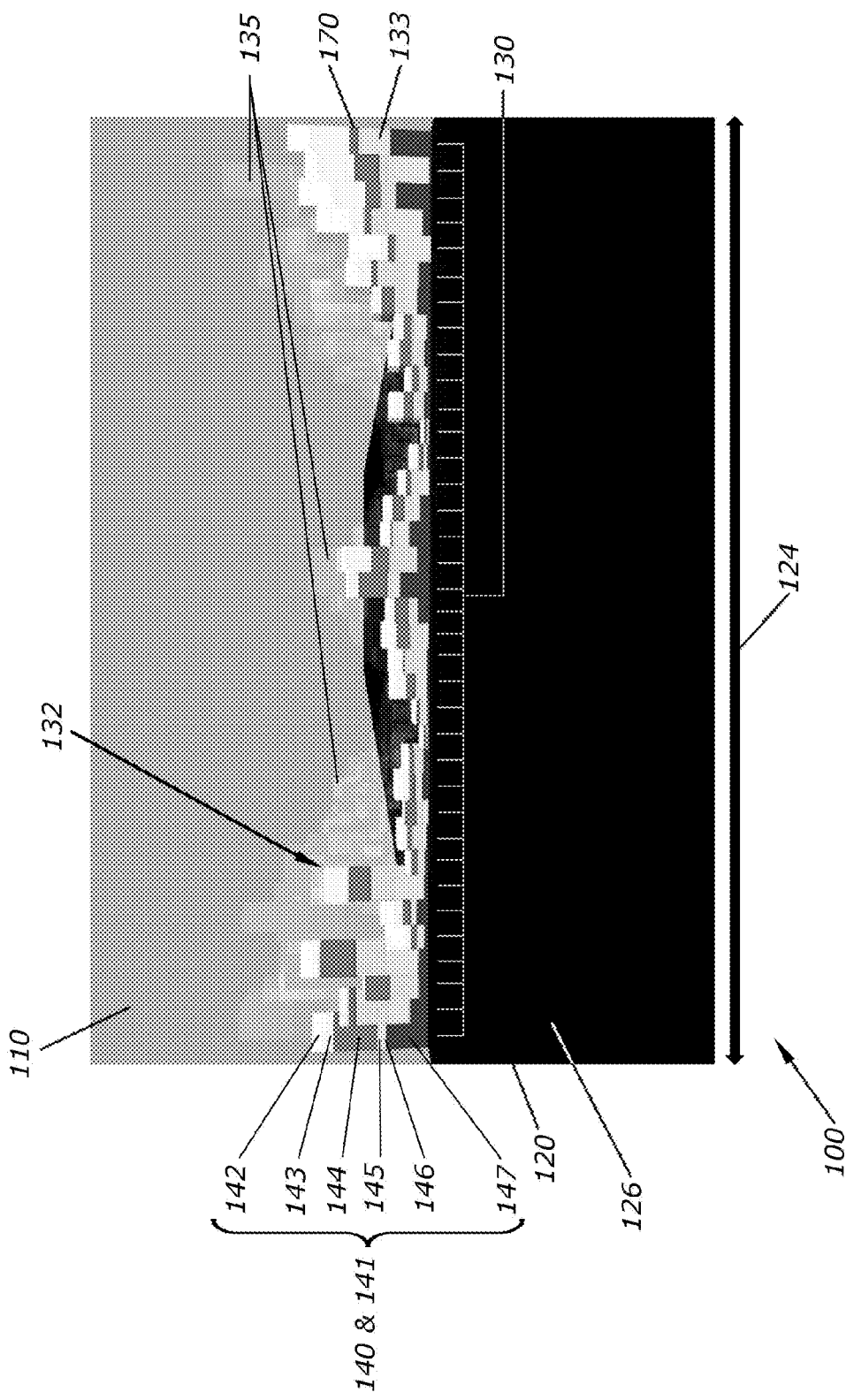
FIG. 1 is a front view of an exemplary three-dimensional visualization showing the impact of weather and traffic conditions on a roadway pavement according to one aspect of the present invention.

The present invention is a system and method of displaying a condition of a pavement that has been affected by different maintenance actions and weather events through time in a visualization model that presents, as an output, a three-dimensional rendering of the impact of weather and traffic conditions on a roadway pavement on a graphical user interface or other display device. FIG. 1 is an example of such a three-dimensional visualization.

Figure 2:
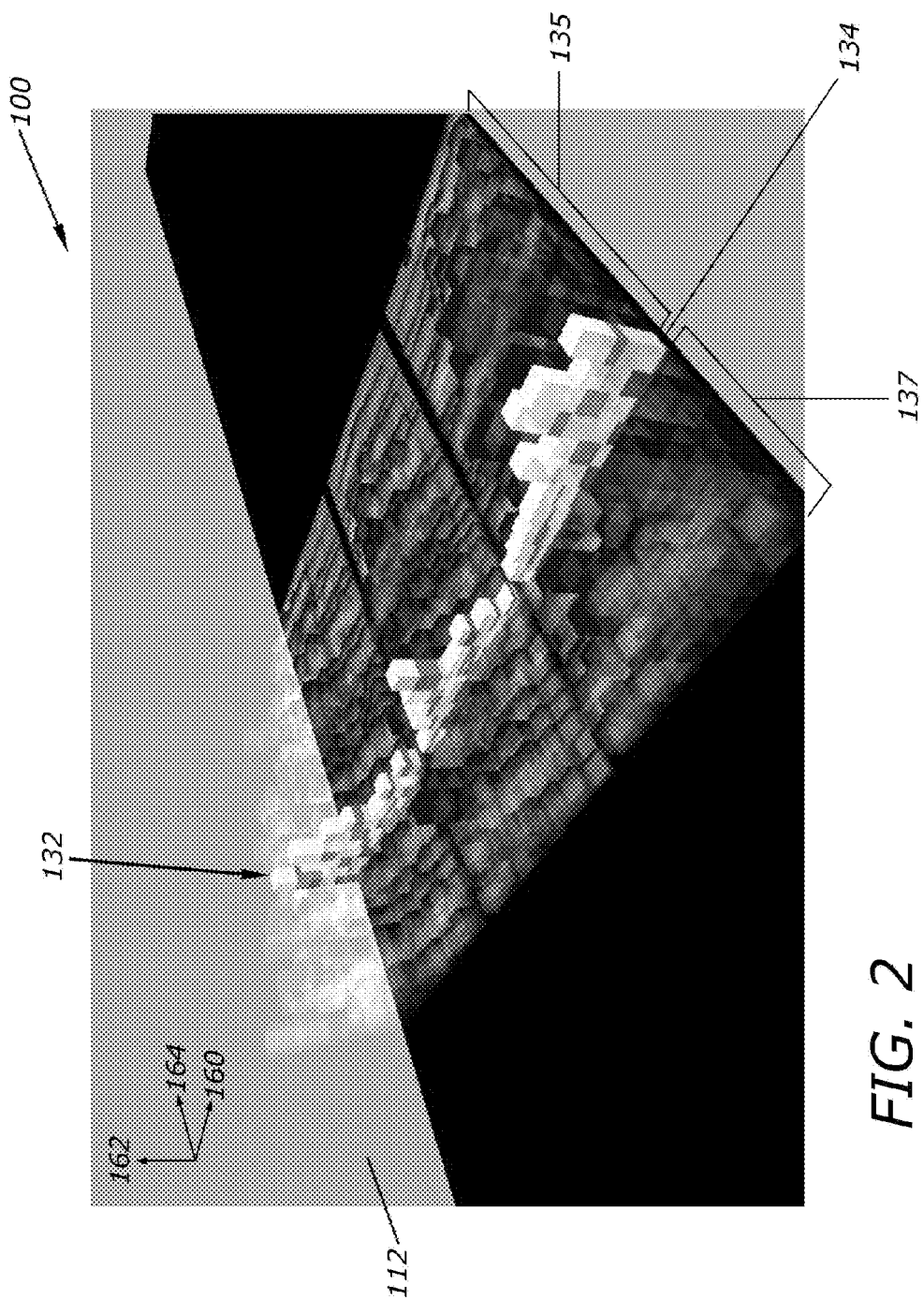
FIG. 2 is an angled view of an exemplary three-dimensional visualization according to one aspect of the present invention.
Figure 3:
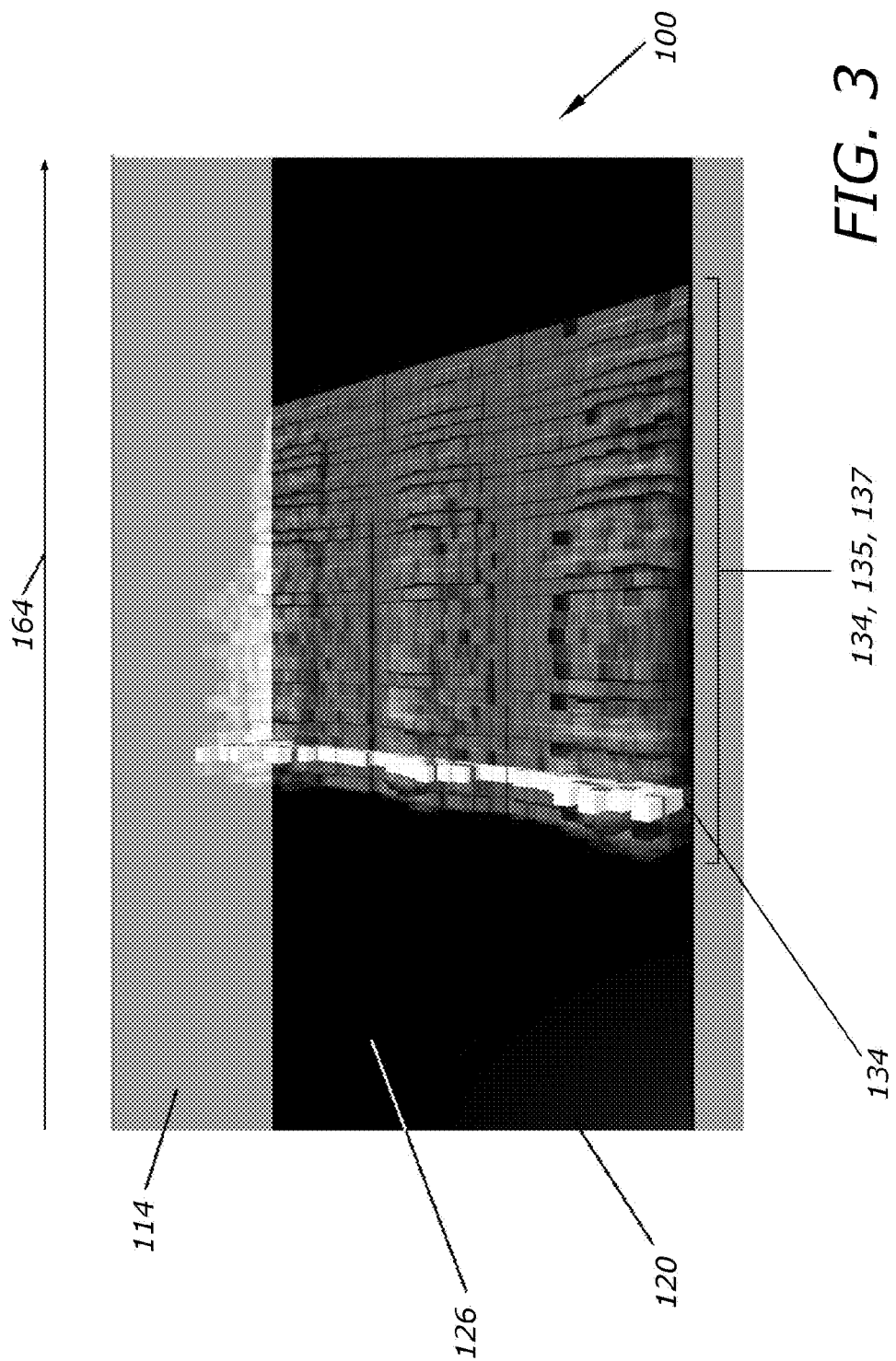
FIG. 3 is a side view of an exemplary three-dimensional visualization according to one aspect of the present invention.

FIG. 1 shows a front view 110 of such a three-dimensional visualization 100 of the impact of weather and traffic conditions on a roadway pavement, and FIGS. 2-3 are additional views of this exemplary three-dimensional pavement visualization 100. In FIG. 1, the front view 110 of a display showing the three-dimensional visualization 100 is indicated, so that a flow of time "into" the page or screen is seen. The display shows a roadway 120, and specifically a lane 122 having a width 124, upon which several slices 130 have been drawn. The roadway 120 is comprised of a pavement 126, which includes a substrate that is comprised of many different materials.

As noted below, each slice 130 of a roadway 120 is assigned a depth 131 and a height 132, and for each slice 130, a value 140 representing an accumulated amount of each type of precipitation 141 at a corresponding point on the pavement 126 is shown. The result is a display of groups representing an equal percentage of a slice's width of the roadway 120 populated with a corresponding accumulated precipitation 141, so that various layers of the pavement 126 and its substrate composition can be visualized.

Precipitation 141 may include compacted snow 142, snow 143, frost 144, liquid 145, sleet 146, ice 147, fluffy snow, slush, chemical wetness, and any other type of precipitation (including no precipitation), in any order and using any color or greyscale 133 indication of different types. FIG. 1 shows present time slices 134 in these colors and/or greyscales 133, and also indicates future time slices 135 with a transparency or opaqueness 136. Each indication of accumulated precipitation 140 in a slice 130 is shown as a rectangular prism 170 in FIGS. 1-5. However, as discussed below, any shape or object may be used to indicate the different amounts of accumulated precipitation 140 in a slice 130.

FIG. 2 shows an angled view 112 of the three-dimensional visualization 100 of the roadway 120. The angled view 122 permits an axial understanding of the present invention, where an x-axis 160 represents the width 124 of the roadway 120, the y-axis 162 represents a depth 131 of accumulated precipitation 140, and a z-axis 164 represents time. The angled view 122 of FIG. 2 also permits a visualization of present time slices 134, future or subsequent time slices 135, and prior time slices 137.

FIG. 3 shows a side view 114 of the three-dimensional visualization 100 of the lane 122 of the roadway 120. The side view 114 permits an understanding of a flow of time represented by the z-axis 164. Available time slices 138 (future 135 and prior 137) are shown as transparent/opaque slices 136, while present time slices 134 are shown in the colors/greyscales 133.

The visualization technique of the present invention is performed according to, and is comprised of in one aspect thereof, a broad computing environment that includes software and hardware components such as one or more processors, configured to execute one or more data processing functions from a plurality of program instructions. The data processing functions generate output data representative of weather and traffic conditions affecting a roadway pavement and present them as visualized indicia for a decision-making tool regarding roadway infrastructure maintenance in a visualization model. These are performed by several computing modules that at least include a data ingest module configured to receive a plurality of input data, such as data from one or more models that simulate and predict pavement condition states in response to traffic characteristic data, weather data, and known road conditions. The visualization model may ingest further data from sources of weather, traffic, and road condition data as needed to augment, or instead of, the simulated and predicted pavement condition states forming the roadway condition information, such as for example from one or more weather forecast models as described further below. The software and hardware components, program instructions, one or more data processing functions, and computing modules may all be portions of the broad computing environment configured to perform the various aspects of the present invention.

The one or more data processing functions may be executed by computing modules that are configured to perform various actions within the visualization model of the present invention. These may include slicing a roadway into one or more representative samples, assigning a depth to each slice, listing, for each slice, an accumulated amount of each type of precipitation at a corresponding point on the roadway so that groups representing an equal percentage of a slice's width of the roadway are populated with a corresponding accumulated precipitation, rendering various layers of a pavement and its substrate composition for visualization, and responding to one or more user instructions via a graphical user interface, such as a touch screen on a display device. Each of these computing modules contributes to generating output data that is displayed according to the visualization model of the system and method described herein on the graphical user interface or other display device. The data processing modules may also include one or more modules configured to generate roadway performance analytics that may be further provided to one or more application programming interface modules for further modeling, simulation, or distribution. Such further modeling and simulation may be performed by one or more tools to generate, for example, content for distribution and/or display with third party platforms, such as for display on a website, via a mobile application, or by entities such as media outlets.

Regardless, the visualization model of the present invention provides a very useful tool for interested parties, such as those responsible for managing the condition of a roadway. For example, as snow falls it is packed by vehicles traveling along the road. As the sun affects the temperature of the pavement, the packed snow and ice turn to slush, and eventually to liquid. Based on these variables, a user would likely proceed with a course of action that would mitigate the negative effects of the weather (plow the road, apply salt brine to the road, etc.). Pavement condition modeling used to provide data for the techniques applied in the present invention is able to predict future pavement condition states based not only on weather variables, but also on these "maintenance decisions" and traffic performance on the roadway. Therefore, the cascading results of different maintenance decisions can be modeled and displayed using the present invention. These results can then be visually compared, enabling a user to decide which decision produced the most desirable road condition.

The visualization model of the present invention is configured to render such data for display in three dimensions for several reasons. First, this data is inherently three-dimensional in nature, as conditions on a roadway do not exist at a single point on the road, but rather continuously along the pavement. Therefore, this data is more easily understood when viewed in an environment that simulates the actual condition it is trying to represent. Second, this data is produced at regular intervals into the future, and therefore each segment of data is linked to a specific point in time. Therefore, the visualization model incorporates the z-dimension to help illustrate the concept of time.

While the z-axis is primarily used to represent time, each slice of the roadway must be also given some depth, in order to make it visible in the three-dimensional representation. The present invention therefore contemplates that each slice can be assigned a depth (d) which represents its magnitude along the z-axis. All of the cross sections are then placed sequentially along the z-axis, where the cross section based at $Z_0$ will represent the cross section generated by the visualization model for time $T_0$, the cross section at $Z_1$ will represent the cross section generated by the visualization model for time $T_1$, and so on (where $Z_1-Z_0=d$). The result of this is a summary of the road condition for the given time period, allowing the user to easily and quickly "see into the future".

The visualization model converts data for three-dimensional rendering by examining, for a particular instant in time, lists of accumulated precipitation across the width of the roadway represented as a slice, one for each of several precipitation variables (for example, snow, fluffy or uncompacted snow, partially or fully compacted snow, frost, rain, ice, slush, chemically wet snow or ice, and un-bonded ice (also known as sleet)). Each element of a list represents the amount of accumulation of its type at the corresponding point on the roadway, with the first element of the list representing the "leftmost" part, or a first end, of the roadway, and the last element representing the "rightmost" part, or a second end, of the roadway. Therefore, there are N groups, also referred to herein as "buckets", across the roadway, where N is the number of items in each accumulation list (all lists will be the same length). Each bucket is assumed to represent an equal percentage of the width of the roadway. The visualization model proceeds by "filling" each bucket with the corresponding accumulations. This is accomplished by taking the nth accumulation out of each accumulation list and assigning it to the nth bucket. Therefore, each bucket or group is now aware of each of its component accumulations.

Visualizations 100 are then achieved in the following manner. Each bucket is represented by a rectangular prism, and is placed contiguously along the x-axis, so that the first bucket will appear on the "left", and the last bucket will appear on the "right". The width of each bucket is identical, and represents an equal percentage of the total "slice" width. Each bucket is arbitrarily assigned a depth along the z-axis to fully realize the three-dimensional aspect of the visualization technique of the present invention. The height of each bucket is generated using its corresponding accumulation data. For each accumulation type, a rectangular prism is drawn inside the bucket, and assigned the same width and depth as the bucket itself, but of a height of only its particular type of accumulated precipitation. The first accumulation is drawn at the bottom of the bucket, and each successive accumulation is drawn on top of the last. Each accumulation is also drawn with a predetermined color, different from the other accumulations. This methodology results visually in one rectangular prism per bucket, where the height represents total accumulation, and the colors represent the components of the accumulation, as shown in FIGS. 1-5. Each slice represents accumulated amounts of precipitation across the width of the roadway at a particular time, and each group, or bucket, has a height representing a total amount of accumulated precipitation of all precipitation types in that group.

While the three-dimensional visualization 100 of accumulated precipitation values 140 mentioned above and shown in the figures is as a rectangular prism 170, it should be noted that there are many different objects that may be utilized. A prism is a three-dimensional object used as a mechanism to differentiate constituent spectral colors to denote different kinds of precipitation, but the prism may take many forms. Therefore, it should be understood that the present invention is not to be limited to any shape or object forming a prism.

The depth 131 of accumulated amounts of precipitation 140 may be represented with any type of prism 170, and many other different 2 or 3 dimensional objects (such as cylinders, pyramids, etc.). However, this introduces varying degrees of limitation. For example, instead of a rectangular prism 170 (a 3D object), the present invention may use a rectangle, which has its two dimensions extend along the width of the roadway 120 (the x-axis) and the depth 131 of precipitation (the y-axis). The subsequent time slices 130 would be placed at some particular spacing in the direction of the z-axis, but no slice 130 itself would have a z-axis.

Nevertheless, a rectangular prism 170 enables the "buckets" to fit together and minimize a level of "noise" in the visualization 100, which could detract from its overall utility. Some shapes may also produce precipitation colors having varying widths in the same bucket, potentially confusing users. All shapes would provide a valid visualization 100 of accumulated precipitation 140, but depending on the display and utility needed, some shapes may detract from an accurate visualization of the summary of the pavement condition for the given time period.

The present invention may also apply a smoothing mechanism to the visualization 100 of accumulated amounts of precipitation 140. That is, instead of having a hard drop-off between each bucket, the present invention may apply a technique to visually smooth out the transition from one bucket to the next. One approach to this may include drawing each bucket with half of the width (x-axis direction) as normal, and for each colored section, drawing an interpolated section between each bucket. That is, for each bucket n, and each color c, draw an interpolated color section between bucket n, color c, and bucket n+1, color c. In this situation, each time slice 130 would appear to be visualized by one continuous object, instead of a series of objects.

Also, it should understood that color is not the only way to differentiate between the types of precipitation 141 in a particular bucket. For example, texture may be applied to each type 141 of accumulated precipitation 140. Raindrops may be used to represent the section of the bucket that visualizes the depth of rain precipitation, and snowflakes may be used to represent the section of the bucket that visualizes the depth of snow. A combination of color and texture may be used to represent two different variables, should this information be provided. For example, heavy rain vs. light rain, both could have a rain texture, but different colors could represent different intensities.

It should be further understood that the three-dimensional visualizations 100 of the present invention may be used for presentation of information in addition to or instead of precipitation 141, such as for example the depth of a material or chemical that has been applied to the roadway. Accordingly, the present invention is not to be limited to three-dimensional visualizations 100 of precipitation 141. It should be further noted therefore that the input data 610 may include specific information related to chemical or other treatments applied to a roadway pavement 124. Visualizations 100 of materials or chemicals may be incorporated together with precipitation 141 (or alone) by, for example, adding a fixed section at the top of each prism 170 or group to indicate that there is material or chemical on the roadway, such as where there is sand or salt on the road.

Once all the slices 131 are placed contiguously, however, it will be difficult to visualize the detail for those slices 131 that are occluded by others. Therefore, the present invention includes the ability to view just one of these slices 131 at a time, while at the same time not removing the others from the roadway 120 (which would degrade the utility) by introducing transparency 136 to the visualization 100. If a user selects one slice 131 of data that they are interested in (perhaps the slice from an hour where the weather is expected to be particularly harsh), the visualization model renders all of the other slices 131 mostly transparent, while keeping the slice 131 they are interested in completely opaque. This allows the user to see the detail at any given time, while still being able to have an overview of the conditions before and after that time. This may be extended to apply focus to different time periods. By making a certain period opaque (such as by making the edges of this period slightly transparent) and the remainder of the visualization 100 substantially transparent, the user is able to visualize the changes in pavement conditions during a particular time of interest.

Figure 4:
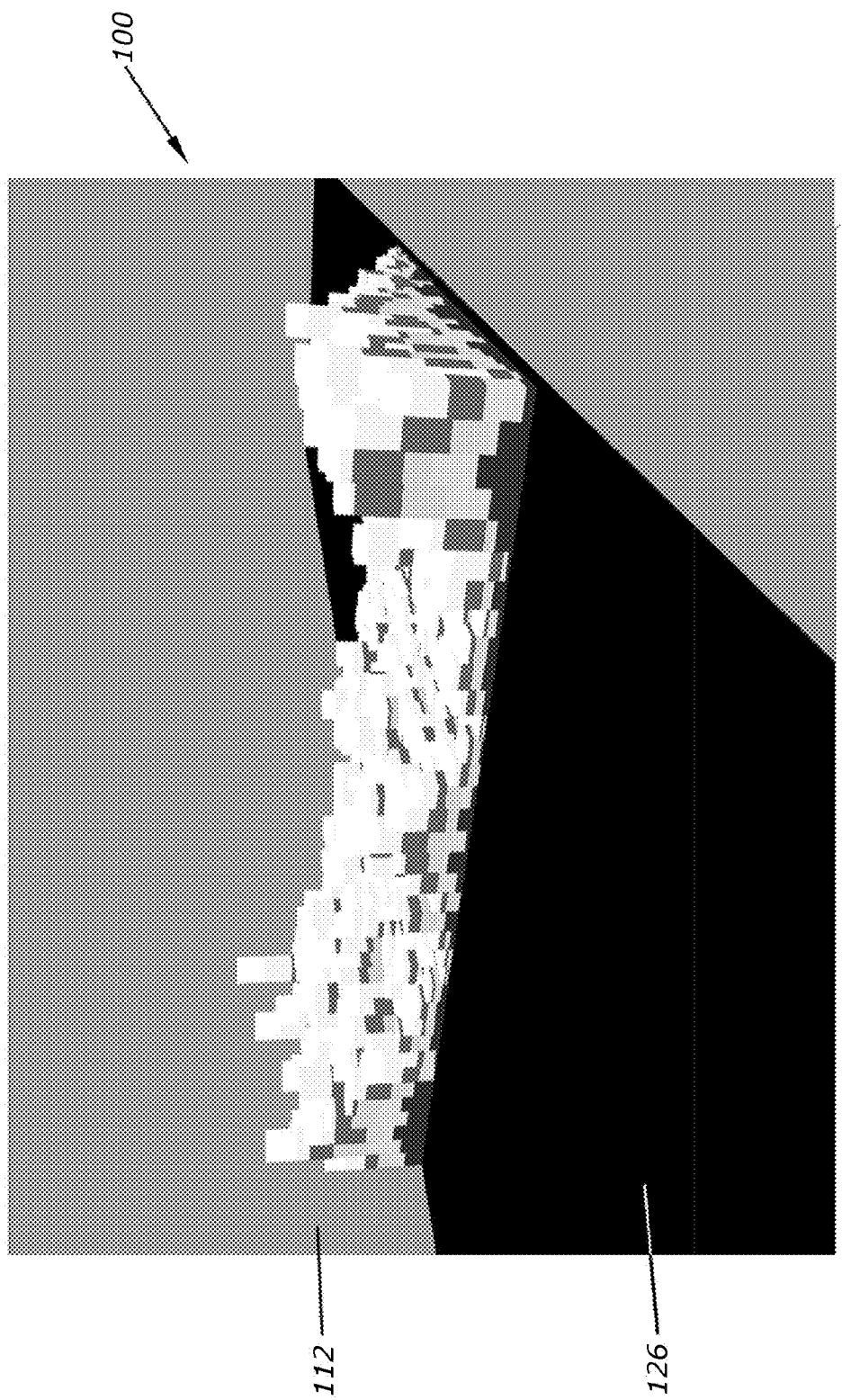
FIG. 4 is an exemplary three-dimensional visualization showing the impact of weather and traffic conditions on a roadway pavement with no transparency according to one aspect of the present invention.
Figure 5:
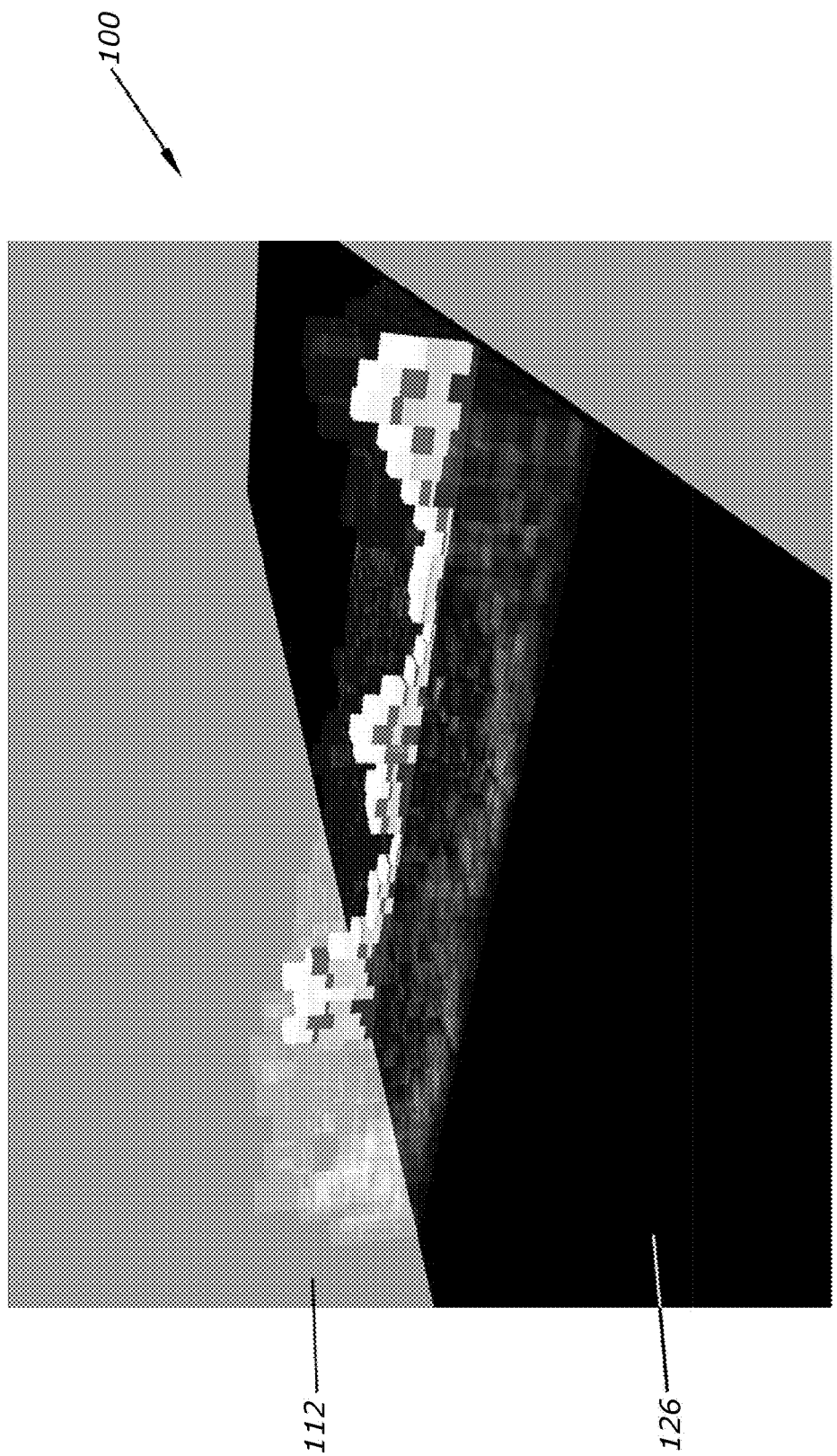
FIG. 5 is an exemplary three-dimensional visualization showing the impact of weather and traffic conditions on a roadway pavement with some transparency according to one aspect of the present invention.

It should be noted that transparency and/or opaqueness 136 is indicated in FIGS. 1-3 is applied at least in part so that a user may easily view a preferred, or present, time slice 134. However, a user may wish to view the visualization 100 without transparency or opaqueness 136, and therefore FIG. 4 shows an angled view of the three-dimensional visualization 100 with no transparency 136. Similarly, FIG. 5 shows a three-dimensional visualization 100 with some transparency/opaqueness 136. FIG. 4 and FIG. 5 together show that by introducing opaqueness to certain time periods of the visualization 100, a user is more easily able to see the accumulated amounts of precipitation 140 of particular time periods. FIG. 4 and FIG. 5 also together demonstrate a level of transparency and opaqueness 136 may be selected by a user, and therefore is to be understood that any level of transparency and opaqueness 136 may be applied to the three-dimensional visualizations 100 described herein.

Each set of pavement conditions for a particular time is represented by a row of rectangular prisms 170. By placing these rows adjacent to each other, pavement conditions can be temporally compared. However, this causes much of the interesting data to be occluded. That is, when one row is placed in front of the other (between the viewer's perspective and the original row), the result is that a significant portion of that row's interesting data is likely to be hidden. The scene can be rotated to place the original row in front, but this, in turn, blocks the second row's data. This issue is compounded when multiple rows are added to the simulation. In this case, all rows are somewhat occluded, and all but the first and last rows are significantly, if not completely, occluded. This severely degrades the quality of the visualization 100, as a large portion of the data becomes unviewable.

As understood from the Figures, this can be overcome by the use of transparency 136, which is accomplished by compositing different components of each object that should be drawn at any particular pixel. One common technique for achieving this is known as Alpha Blending, in which each pixel to be drawn to the screen is defined with an "alpha value", in addition to the traditional red, green, and blue components. The alpha value could be considered as an "importance" factor, that is, how much of an influence this pixel should have in the final output image. There are many other known techniques to achieve transparency 136, and they can vary by platform, software, color space, etc.

As noted above, input data for the three-dimensional visualization 100 incorporates information from one or models of a state of a roadway. This roadway state information is an analysis of pavement conditions that utilizes at least traffic and weather data to simulate the impact of traffic characteristics and weather conditions on a particular section, or segment, of a transportation infrastructure over specific periods of time.

To augment the visualization(s) 100 generated in the model of the present invention, additional input such as traffic data, weather data, and data regarding road characteristics may be further ingested from multiple sources, including for example traffic data provided by third parties and/or collected from road or traffic sensors, and weather data collected from one or more of weather sensors, satellite networks, vehicle-based systems, and numerical weather prediction models. Information regarding traffic, weather, and road conditions may also be ingested from crowd-sourced observations using mobile applications configured on devices such as telephones and tablets, and using social media feeds. The visualization(s) may also be further augmented by data provided from one or more maintenance decision support systems, which may aid in the ability to visualize the effect of maintenance activities on the roadway over time, as noted above.

Figure 6:
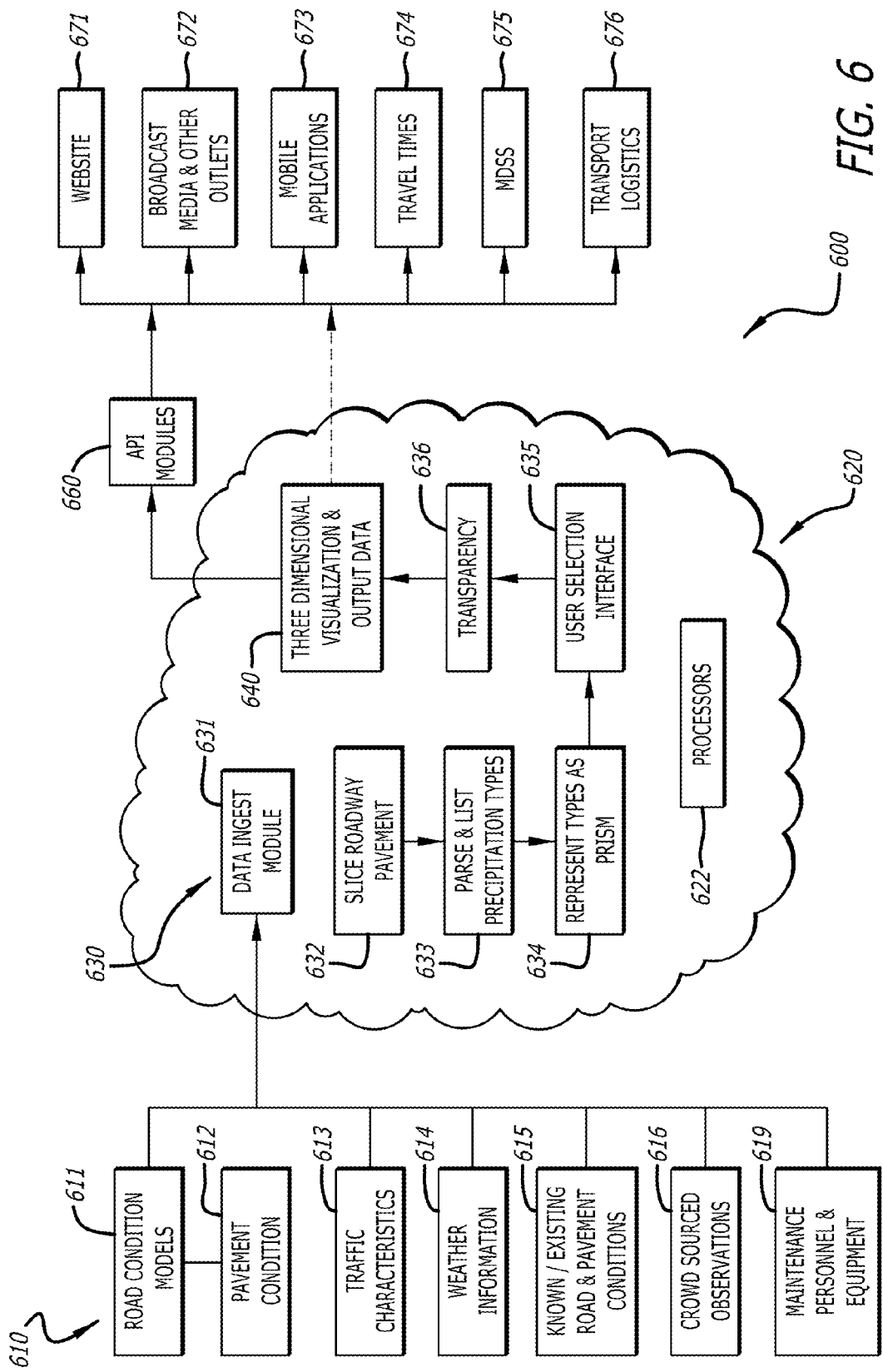
FIG. 6 is a diagram of a process of generating three-dimensional visualization showing the impact of weather and traffic conditions on a roadway pavement according to one aspect of the present invention.

FIG. 6 is a diagram 600 of a process of generating a three-dimensional visualization 100 according to one aspect of the present invention. Input data 610 is ingested/imported into, or received by, a computing environment 620 comprised of at least one processor 622 and a computer-readable storage medium operably coupled to the at least one computer processor. Program instructions may be executed by the at least one processor 622 to perform one or more data processing functions 630 in such a computing environment 620.

Input data 610 at least includes a pavement condition 612 of the roadway 120 from a simulation and prediction of pavement condition states 611 in response to one or more of traffic characteristic data 613, weather data 614, and known or existing road conditions 615 from crowd-sourced observations 616 or other sources of such real-time data, such as direct input from maintenance personnel, maintenance equipment, and maintenance decision support systems, etc., over a specific period of time. The pavement condition 612, and the input data 610, may include past, present, and future data, and therefore it is to be understood that the three-dimensional visualization 100 of the present invention may present accumulated amounts of precipitation 140 for any desired time slice, including past, present, and future time periods.

The data processing functions 630 use the input data 610 to create one or more three-dimensional representations 100 of the pavement condition 612. The data processing functions 630 include a function that slices 632 a roadway pavement 126 into one or more representative samples and assigning a depth to each slice 130, and another that lists or parses 634 an accumulated amount 140 of each type of precipitation 141 at a corresponding point on the roadway 120 for each slice 130. The data processing functions 630 may also include a function that represents 636 each group by a rectangular prism 170 placed contiguously along an x-axis. As noted above, for each accumulation type 141, a rectangular prism 170 is created inside the group, and assigned the same width and depth as the group itself, but of a height of only its particular type 141 of precipitation. In this function, each prism 170 for each accumulated precipitation 140 is successively created on top of a previous prism starting from a bottom of the group, to visually render one rectangular prism 170 per group, so that a height of each group represents total accumulated precipitation 140.

The data processing functions 630 may also include a user interface component 637 configured to respond to a user selection of one slice 130 of roadway 120 of interest, and a transparency component 638 configured to render all of the other slices 130 substantially transparent, while keeping the slice 130 of interest substantially opaque to enable the user to view detail at any given time slice. The data processing functions 630 may also include a data ingest function 631, configured to manage the intake, request, and/or reception of data for the process shown in FIG. 6.

The process shown in FIG. 6 also includes generating output data 640 representing a three-dimensional visualization 100. This output data 640 may be used for generating follow-on services or other processing in one on more application programming interface (API) modules 660, and may be provided directly to third-party applications or consumers for additional functions. Examples of these follow-on services or third-party applications include displaying the three-dimensional visualizations 100 on a website 671, using the three-dimensional visualizations 100 in broadcast media 672 or other such outlets, and providing three-dimensional visualizations 100 on one or more mobile applications 673. Other utilities of the output data 640 representing three-dimensional visualizations 100 may include roadway analytics such as calculating travel times 674, determining routing for applications such as transportation logistics 676, and as a set of input data for processing in maintenance decision support systems 675.

Roadway analytics may also include reporting and/or advisories of roadway and pavement conditions, such as for example generating an advisory that the roadway is dry, damp, damp near freezing, wet, wet near freezing, or chemically wet. Other advisories may inform that the roadway has a dusting of snow, is lightly snow-covered, or snow-covered, or has deep snow or compacted or partially compacted snow. Still other advisories may warn of lightly slushy, slushy, deep slush, some risk of frost, frost likely, lightly icy, icy, or very icy conditions.

Information to be displayed in the methodology described herein for visualizing accumulated precipitation 140 on a roadway 120 may be provided from many different sources. As noted above, one such source is a pavement condition model which simulates and forecasts pavement condition states from the interactions between changing weather conditions, the roadway's surface and pavement composition, the ambient environment, winter road maintenance activities, and the traffic on the road.

Precipitation 141 falling on the roadway 120 can be accumulated into various forms, such as liquid, ice, snow, etc., then potentially change form and/or be removed from the road thereafter, whether by natural, mechanical and/or chemical processes. Exchanges of both moisture and energy with the surrounding environment play a key role in dictating how the pavement condition will evolve over time. For example, simulation of latent heat fluxes (heat exchanges related to changes in the state of water) requires modeling of heat exchanges associated with evaporation, sublimation, condensation, deposition (frost formation), and phase changes (e.g., water freezing on the road surface)—naturally or chemically induced—occurring on the roadway. Energy fluxes associated with the radiation received by and emitted from the roadway, and owing to differences in temperature between the road and its substrate, as well as between the road and the overlying air, must also be simulated.

A pavement condition model analyzes distinctions between mass and/or energy balances, typically using an equation of unsteady heat flow, combined with sophisticated parameterizations for representing heat and moisture exchanges between the road, the atmosphere, and pavement substrate, to forecast pavement conditions. Balance between mass and energy, particularly in a pavement surface condition context, means that changes in the state of moisture occur only as energy flows permit, so that for example, evaporating moisture away from the road surface requires energy from the road surface, which cools it. Dew or frost formation have the opposite effect of putting energy into the pavement. Perhaps more importantly, however, are changes between liquid and solid states of moisture. For example, in order for a road that has ice on it to warm above freezing, or vice-versa, the latent heat of fusion must be overcome. This normally causes the road temperature to stabilize at the freeze point temperature while this phase transition occurs. This also means that when moisture (as snow, rain, frost, dew) is deposited onto the road it also transfers energy to or from the road, and that evaporation or sublimation of moisture from the road requires the road to have an adequate amount of energy available to support those processes.

The ability to appropriately simulate the partitioning of moisture into its different forms directly influences how traffic will impact the pavement condition. With sufficient liquid moisture present, traffic acts to splatter or spray the entire mixture off of the road surface. Transitions in this behavior occur as the amount of liquid in the mixture decreases, first to a consistency where the moisture atop the road is simply moved short lateral distances with the passage of each successive vehicle, and eventually to a consistency where the mixture is increasingly taken under the tires of each successive vehicle where it can be compacted into a more hardened form that is both difficult to travel upon and difficult to remove. Winter maintenance activities often seek to maintain sufficient liquid in this mixture so as to prevent this deterioration.

In a pavement condition model such as the HiCAPS model that may provide the data for the visualizations 100 of the present invention, the impacts of traffic are simulated by running virtual vehicles through the model at a rate consistent with reality for the given stretch of road. Each vehicle is assigned slightly different properties in terms of tires (tire width, number of tires, etc.), width between tires, and the specific track it follows within the lane. The assignment of these properties and the track each virtual vehicle follows within the model is done in a fashion that is statistically representative of real-world traffic characteristics. As this virtual traffic flows in the model, the various buckets of moisture are transformed and/or horizontally migrated across and/or off of a cross section of the road, depending in part on the properties of that moisture.

For instance, as mentioned above, snow may be compacted under the tires if insufficient liquid is present, spread or splattered to the side if it is slushy, or suctioned off by the vacuum behind the passing vehicle if it is light, fluffy and/or dry snow. Liquid water can be sprayed or splattered away, or run off through the effects of gravity on a sloped road, etc. The end result is a simulation of the state of the road that provides a realistic visual representation of what the road is likely to look like to persons traveling the road.

The simulation of this cross-sectional pavement condition is also modulated by other factors impacting the roadway, including natural and anthropogenic exchanges of energy, which can change the road temperature and the phase(s) of moisture present atop the road. Simulated maintenance activities can also alter the cross sectional profile. For instance, a virtual snowplow being run across the simulated road can clear much of the moisture away, and even out the variability in the cross sectional depths of the various forms of moisture. Deicers that maintenance vehicles apply to the road can likewise lead to changes in the phases and consistency of moisture present atop the road, which can in turn modulate how traffic impacts the pavement conditions thereafter.

The physical properties of the road and the environment also play key roles in dictating the response of the road condition and its cross-sectional profile to weather conditions. These factors include the roadway's albedo, heat capacity, conductance, texture, and emissivity of the pavement and its substrates, the solar and longwave radiation received at the top surface of the pavement, shading and sheltering effects by surrounding trees and terrain, the atmospheric temperature, humidity, wind speed, and precipitation, as well as the profound effects of winter maintenance activities and traffic.

Many types of displays of modeled data are possible, and contemplated within the scope of the present invention, using the output information from pavement condition modeling described above. These pavement condition modeling capabilities enable supplemental information in the form of animated time series of cross-sectional pavement conditions, or underlay maps of road conditions that go with weather forecast graphics. Graphs or other indications of road temperatures at various times may be presented alongside other weather information, for example in presentations of road temperature and/or condition information that involve moving screens highlighting conditions at varied intervals over the course of the next day on a display. The techniques of representing accumulated precipitation on a roadway as three-dimensional visualizations 100 of the present invention may therefore be applied to these other types of displays of data.

The visualizations 100 of the present invention may be presented via web- or application-based presentations based tools, and may also be integrated into broadcast media presentation tools as noted above. Map-based presentations depicting the expected response of pavement conditions to expected weather events and traffic influences are also contemplated and within the scope of the present invention. Other types of displays may include indicators of the expected adversity of travel conditions based on the road condition data, and predictive routing for individual motorists as well as commercial transportation logistics in, for example, a travel-oriented weather or traffic prediction tool.

As noted above, the present invention incorporates weather information 614 to determine, at least in part, the amount of accumulated precipitation 140 on the roadway 120, as well as in pavement condition modeling, for the visualizations 100 according to the present invention. Many different types of weather information 614 may be utilized, including real-time, historical, and forecasted data representative of assessments of localized weather conditions, and long-range climatological and/or meteorological forecasting in one or more predictive weather models.

Such real-time data representative of assessments of localized weather conditions may be produced by many different sources of meteorological data to provide one or more of observed weather data and current analyses of observed weather data, and predicted weather data, for example as data that is complementary to the data assimilation systems and forecasting systems noted below. Such additional sources of weather data may include data from both in-situ and remotely-sensed observation platforms. For example, numerical weather prediction models (NWP) and/or surface networks may be combined with data from weather radars and satellites to reconstruct the current and near-term forecasted weather conditions on any particular area to be analyzed. There are numerous industry NWP models available, and any such models may be used as sources of meteorological data in the present invention. Examples of NWP models at least include RUC (Rapid Update Cycle), WRF (Weather Research and Forecasting Model), GFS (Global Forecast System) (as noted above), and GEM (Global Environmental Model). Meteorological data is received in real-time, and may come from several different NWP sources, such as from the European Centre for Medium-Range Weather Forecasting (ECMWF), Meteorological Services of Canada's (MSC) Canadian Meteorological Centre (CMC), as well as the National Oceanic and Atmospheric Administration's (NOAA) Environmental Modeling Center (EMC), and many others. Additionally, internally or privately-generated "mesoscale" NWP models developed from data collected from real-time feeds to global and localized observation resources may also be utilized. Such mesoscale numerical weather prediction models may be specialized in forecasting weather with more local detail than the models operated at government centers, and therefore contain smaller-scale data collections than other NWP models used. These mesoscale models are very useful in characterizing how weather conditions may vary over small distances and over small increments of time. The present invention may be configured to ingest data from all types of NWP models, regardless of whether publicly, privately, or internally provided or developed.

Long-range climatological and/or meteorological forecasting may be generated by, in one aspect of the present invention, dynamical extended range weather forecast models generated from known methods for inter-seasonal to inter-annual climate prediction, which have evolved into a combination of deterministic and statistical modeling schemes that permit the capture of long-term low-frequency features. Such forecasting often requires global analyses for the specification of observed initial and boundary conditions, the use of sophisticated numerical weather prediction models, a statistical treatment of the model results, and a verification of the forecast results as a feedback into forecast refinement.

Long-range climatological and/or meteorological forecasting may involve the use of two data assimilation systems and two forecasting systems. The two data assimilation systems may be used to provide historic and current atmospheric and land surface initial conditions and also global ocean temperatures. For example, the two forecast systems may incorporate the U.S. National Centers for Environmental Predictions (NCEP) Global Forecast System (GFS) for atmospheric predictions and the Geophysical Fluid Dynamics Laboratory Modular Ocean Model to provide sea-surface temperature predictions. Software and data supporting the above are publicly available from the NCEP.

Another embodiment of the present invention includes a system and method of visualizing output data 640 from one or more agricultural models that take into account weather, crop, soil, and other variables such as irrigation, pest and disease presence/risk, and tillage practices. This output data 640 contains information related to the depths of accumulated precipitation 140 and other factors in a soil's or crop's condition, across "slices" of a field for each particular time in a given time period. A soil system may be divided into these representative samples or slices across a section of a field being observed, similar to that of a lane of a roadway.

Agricultural condition information may therefore also be a type of input data 610 for this embodiment of the present invention. Such agricultural condition information may include crop specifications such as for example the type and variety of crop, and planting data, such as for example the date that a field was planted with seed. The input data 610 may also include remotely-sensed imagery data of crop growth and accumulated precipitation 140, such as for example those captured from orbiting satellites that when processed provide details at a field level resolution. The input data 610 may also include soil information, field tillage and harvest practice information, irrigation/artificial precipitation information, and output data from the one or more agricultural models, such as for example augmented crop growth models or customized land-surface models.

Similar to the representations for roadways, the present invention represents this agricultural condition information in three dimensions: x, y, and z. The x-axis represents the section of the field, and the y-axis represents the depths of data being visualized, such as precipitation. Different colors or greyscale shades may be applied to represent the different data types. Using these two dimensions (x and y), the present invention displays a visual representation of what data such as the accumulated precipitation would look like in an actual section of the field. As with pavement condition data, the z-axis represents time. The present invention displays a representation of a field for each time sample provided by the crop, soil, irrigation, or other agricultural model. The result is the appearance of a section of field upon which data such as accumulated precipitation increases or decreases over time corresponding to the results of weather, crop growth, and other agricultural activity in that field.

Traffic characteristics data 613 may include many different types of information, collected from several different sources. For example, traffic characteristics data 613 may represent traffic speed, traffic flow, and conditions on a roadway affecting speed and flow, such as weather and incidents. Sources of traffic characteristics data 613 may include one or more of traffic sensors, probes, and detectors. Other sources include camera and video systems, global positioning systems, historical database collections, in-vehicle communication equipment, and crowd-sourced observations.

Many applications of the visualization model are contemplated and are within the scope of the present invention. For example, output data of the present invention may be used a training tool for those who are in charge of or responsible for managing roadway infrastructure. Using the visualization model of the present invention, users may for example view the predicted future condition of a roadway that has undergone no treatment. Subsequently, options for different maintenance actions may be provided, and when a user "applies" a treatment at a certain time, the visualization model can be updated (for example, through animation) to reflect the newly predicted-condition of the roadway over time. This is beneficial to those in training, as it provides immediate, useful feedback on the results of their decisions, thus leading to a more effective training experience. Likewise, those who are already responsible for managing roadway infrastructure may use output from the visualization model to confirm that their decisions will produce the desired outcome.

The systems and methods of the present invention may be implemented in many different computing environments. For example, they may be implemented in conjunction with a special purpose computer, a programmed microprocessor or microcontroller and peripheral integrated circuit element (s), an ASIC or other integrated circuit, a digital signal processor, electronic or logic circuitry such as discrete element circuit, a programmable logic device or gate array such as a PLD, PLA, FPGA, PAL, and any comparable means. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more computing modules configured to carry out those program instructions. Computing modules are intended to refer to any known or later developed hardware, software, algorithms, firmware, artificial intelligence, fuzzy logic, expert system or combination of hardware and software that is capable of performing the data processing functionality described herein. Computing modules may therefore be configured to execute programming code and other instructional language to perform the various data processing functions described herein.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method comprising:
   ingesting a plurality of input data into a computing environment comprised of at least one processor and a computer-readable storage medium operably coupled to the at least one computer processor and having program instructions stored therein to perform one or more data processing functions, the plurality of input data representing a pavement condition in response to one or more of traffic characteristics, weather information, and existing road conditions for a specified period of time;
   modeling the plurality of input data to summarize the pavement condition in one or more three-dimensional representations of accumulated precipitation on a roadway, by:
      slicing the roadway into one or more representative segments and assigning a depth to each slice,
      listing, for each slice, an accumulated amount of precipitation of each precipitation type on the roadway, with a first element of a list representing a first end of the roadway, and a last element of the list representing a second end of the roadway, and defining one or more groups each representing an equal portion of a slice's width of the roadway and populated with a corresponding accumulated amount of precipitation, each group having a height representing a total amount of accumulated precipitation of all precipitation types in the group,
      representing each group by a rectangular prism placed contiguously along an x-axis, wherein for each precipitation type, a prism section is created inside the group, and having a same width and depth as the group, so that each prism section for each accumulated precipitation type is successively created on top of a previous prism section starting from a bottom of the group to visually render one rectangular prism per group, so that each slice represents accumulated amounts of precipitation across the width of the roadway, and
      responding to a selection of one slice of roadway of interest, and rendering all of the other slices of roadway substantially transparent, while keeping the slice of interest substantially opaque to enable a detailed view of the accumulated amount of precipitation of each precipitation type at any time.

2. The method of claim 1, further comprising generating the three-dimensional representation of the pavement condition for the specified period of time on a graphical user interface.

3. The method of claim 1, wherein the pavement condition is an output of a simulation and prediction of pavement condition states on at least one representative sample of the roadway.

4. The method of claim 1, wherein the traffic characteristics information includes data representing at least one of traffic speed and traffic flow, and is collected from plurality of sources that include one or more of traffic sensors, camera and video systems, global positioning systems, historical database collections, and in-vehicle communication equipment.

5. The method of claim 1, wherein the weather information includes at least one of current field-level weather data and extended-range weather data.

6. The method of claim 1, wherein the existing road conditions includes known road conditions collected from real-time data representing the pavement condition reported from users of the roadway.

7. The method of claim 1, wherein the existing road conditions includes information provided by at least one of maintenance personnel, maintenance equipment, and a maintenance decision support system.

8. The method of claim 1, wherein a precipitation type includes at least one of liquid, ice, sleet, frost, snow, compacted snow, and no precipitation.

9. A system comprising:
   a computing environment including at least one computer-readable storage medium having program instructions stored therein and a computer processor operable to execute the program instructions to summarize a pavement condition over a specified period of time in one or more three-dimensional representations within a plurality of data processing modules, the plurality of data processing modules including:
   a data ingest module configured to ingest input data representing a pavement condition in response to one or more of traffic characteristic data, weather data, and existing road conditions for the specified period of time;
   a conversion module configured at least to model the input data by:
      slicing the roadway into one or more representative segments and assigning a depth to each slice,
      listing, for each slice, an accumulated amount of precipitation of each precipitation type on the roadway, with a first element of a list representing a first end of the roadway, and a last element of the list representing a second end of the roadway, and defining one or more groups each representing an equal percentage of a slice's width of the roadway and populated with a corresponding accumulated amount of precipitation, each group having a height representing a total amount of accumulated precipitation of all precipitation types in the group, and representing each group by a rectangular prism placed contiguously along an x-axis, wherein for each precipitation type, a prism section is created inside the group, and having a same width and depth as the group, so that each prism section for each accumulated precipitation type is successively created on top of a previous prism section starting from a bottom of the group to visually render one rectangular prism per group, so that each slice represents accumulated amounts of precipitation across the width of the roadway;

an integration module configured to respond to a selection of one slice of roadway of interest, and render all other slices or roadway substantially transparent, while keeping the slice of interest substantially opaque; and a visualization module configured to receive output from the conversion module representing modeled input data and generate the three-dimensional representation of the pavement condition for the specified period of time on a graphical user interface.

10. The system of claim 9, wherein the pavement condition is an output of a simulation and prediction of pavement condition states on at least one representative sample of the roadway.

11. The system of claim 9, wherein the traffic characteristics information includes data representing at least one of traffic speed and traffic flow, and is collected from plurality of sources that include one or more of traffic sensors, camera and video systems, global positioning systems, historical database collections, and in-vehicle communication equipment.

12. The system of claim 9, wherein the weather information includes at least one of current field-level weather data and extended-range weather data.

13. The system of claim 9, wherein the existing road conditions includes known road conditions collected from real-time data representing the pavement condition reported from users of the roadway.

14. The system of claim 9, wherein the existing road conditions include information provided by at least one of maintenance personnel, maintenance equipment, and a maintenance decision support system.

15. The system of claim 9, wherein a precipitation type includes at least one of liquid, ice, sleet, frost, snow, compacted snow, and no precipitation.

16. A method of representing a summary of a pavement condition over a specified period of time as a three-dimensional visualization, comprising:

identifying a segment of a roadway and representing the segment of roadway as a sliced sample, each sliced sample having an assigned depth;

identifying accumulations of one or more types of precipitation across the sliced sample, wherein the one or more types of precipitation are identified from one or more of traffic characteristic data, weather data, and existing road conditions for the specified period of time having an impact on a pavement condition on the roadway;

grouping the accumulations of one or more types of precipitation in a rectangular prism that enables a visualized summary of conditions on the roadway, so that groups representing an equal percentage of a slice's width of the roadway are populated with a corresponding accumulated amount of precipitation, and creating a rectangular prism to represent each group, wherein for each precipitation type, a prism section is created inside the group, and having a same width and depth as the group, and a height representing only its particular accumulated precipitation type, so that each prism section for each accumulated precipitation type is successively created on top of a previous prism section starting from a bottom of the group, where a height of each group represents total accumulated precipitation of all types inside each group, so that the sliced sample includes accumulated amounts of precipitation across the width of the roadway; and displaying a pavement condition as a three-dimensional rendering of the impact of the one or more of traffic characteristic data, weather data, and existing road conditions for the specified period of time on the pavement on a graphical user interface.

17. The method of claim 16, further comprising responding to a selection of one slice of roadway of interest, and rendering all of the other slices of roadway substantially transparent, while keeping the slice of interest substantially opaque to enable a detailed view of the accumulations of one or more types of precipitation.

18. The method of claim 16, wherein the pavement condition is an output of a simulation and prediction of pavement condition states on at least one section of the roadway.

19. The method of claim 16, wherein the traffic characteristics information includes data representing at least one of traffic speed and traffic flow, and is collected from plurality of sources that include one or more of traffic sensors, camera and video systems, global positioning systems, historical database collections, and in-vehicle communication equipment.

20. The method of claim 16, wherein the weather information includes at least one of current field-level weather data and extended-range weather data.

21. The method of claim 16, wherein the existing road conditions includes known road conditions collected from real-time data representing the pavement condition reported from users of the roadway.

22. The method of claim 16, wherein the existing road conditions include information provided by at least one of maintenance personnel, maintenance equipment, and a maintenance decision support system.

23. The method of claim 16, wherein the precipitation type includes at least one of liquid, ice, sleet, frost, snow, compacted snow, and no precipitation.

* * * * *